June 20, 1967  A. ZURLINDEN  3,325,903
STRUCTURAL MEASURING GAUGE
Filed Sept. 3, 1964  3 Sheets-Sheet 3
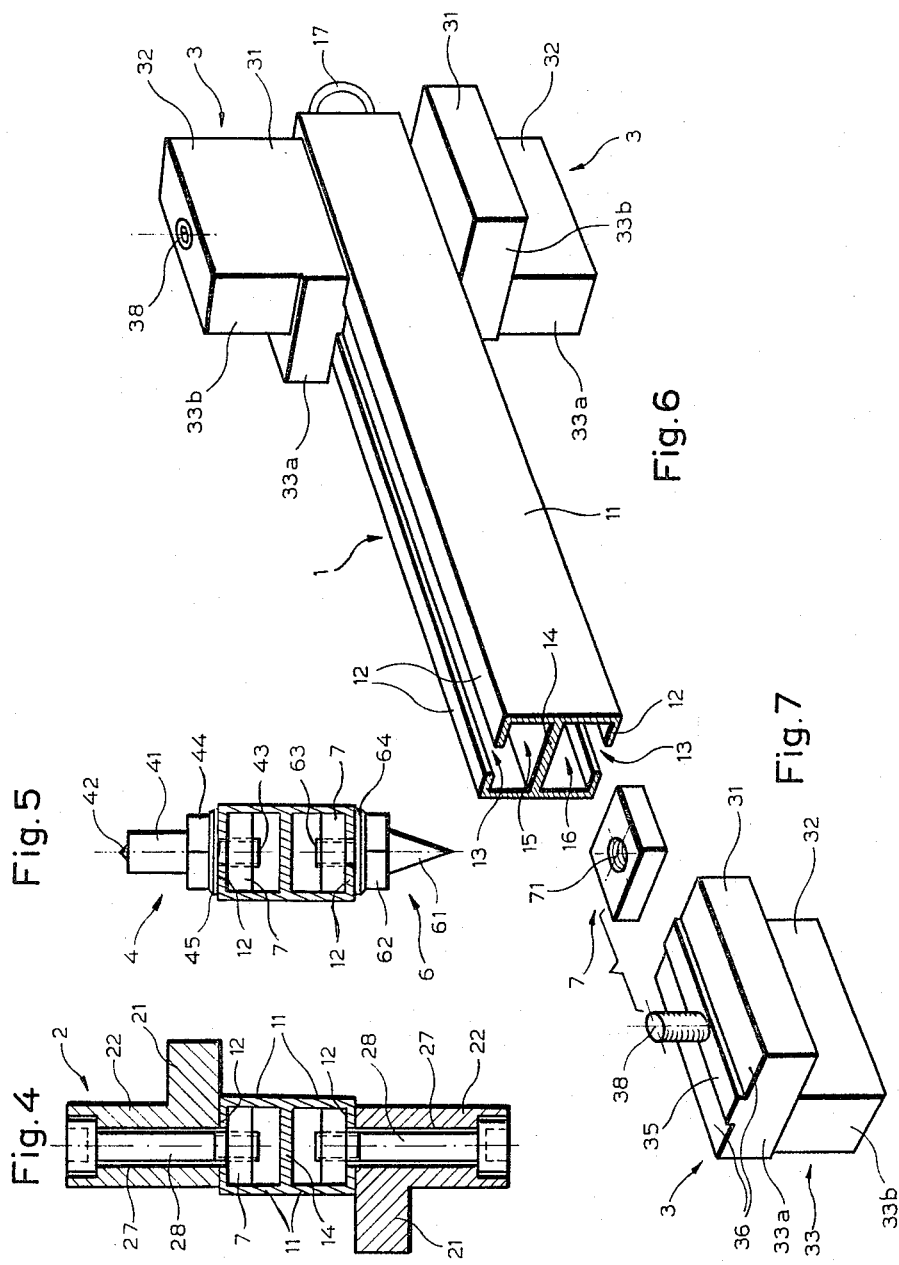
INVENTOR.
Adolf Zurlinden
BY Dicke & Craig
ATTORNEYS United States Patent Office 3,325,903
Patented June 20, 1967

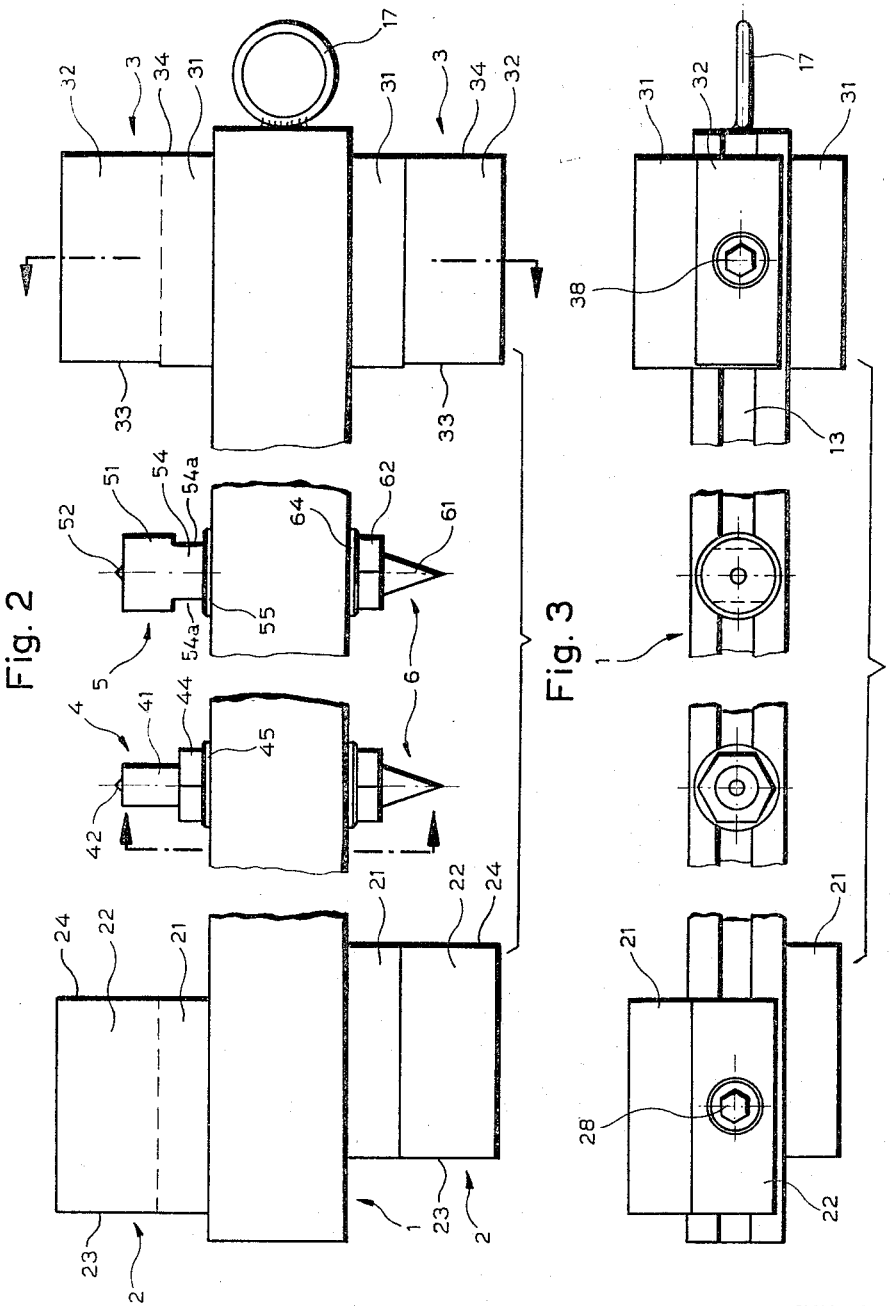

3,325,903
STRUCTURAL MEASURING GAUGE
Adolf Zurlinden, Rastatt, Baden, Germany, assignor to Anton Bilek, Philippsburg, Baden, Germany
Filed Sept. 3, 1964, Ser. No. 394,188
Claims priority, application Germany, Sept. 5, 1963, Z 8,727
4 Claims. (Cl. 33—158)

This invention relates to a structural measuring gauge for use as a measuring gauge and limit-size in the manufacture of wood, plywood and building panels, particularly in the manufacture of furniture.

The industrial, mass production of furniture and other laminar objects, that is, those parts made of wood, plywood, building panels and the like require, for the performance of accurate working operations stationary individual rulers, the so-called measuring gauges. With those, the length, the width and the measurements and distances of other construction characteristics of the piece to be finished, such as notches, recesses, bores for pegs and the like are determined.

In accepting the deviations from the theoretical measurement, which cannot be avoided in practice, tolerances are usually provided which may be different from workpiece to workpiece and which are limited by an upper and a lower limit. A structural measuring gauge should, therefore, advantageously provide the capability of checking the workpiece for the adherence to these limits.

The measuring gauges presently known in the woodworking industry only partially fulfill this requirement. They usually consist of a hollow rectangular bar in the form of a rail onto which stops and measuring bolts are attached by means of clips or clamps stretched or clamped around the outside of the bar. As a result, such measuring gauges provide only one side at a time for use, for example, for use for the longitudinal or lateral measurement of a workpiece. In many cases, however, the measuring bolts for the longitudinal measurement and the lateral measurement must be arranged at equal distances from the end stop, which however, is not possible on account of the construction of the fastening elements for the measuring bolts, for example, the normally used pipe straps. In addition, measuring gauges which provide an upper and a lower limit measurement for measuring and checking the required tolerances are not known in the woodworking industry.

It is the purpose of the present invention to create a measuring gauge for use in the manufacture of wood, plywood and building panels, particularly for the manufacture of furniture, which in all cases provides two sides for use, for example, for longitudinal measurements and lateral measurements and which by providing them with limit measurements allows the setting and a maintaining of the tolerances. The problem is solved according to the invention thereby that the rail is constructed as a symmetrical hollow profile provided with two guide slots on each side of the plane of symmetry for stops and measuring bolts; that the legs of the structural profile are arranged on both sides of the guide slots are finished as flat support surfaces for the stops and measuring bolts; and that the stops and measuring bolts are detachably fastened by means of screw bolts extending through the slots and counter units which are in contact with and can be loosened from the inside of the hollow profile. By shifting the fastening elements to the interior of the hollow profile, it is possible to arrange and fasten additional stops and measuring bolts, respectively, at opposite sides of the rail and at an equal distance from the end stop.

In a preferred embodiment of the invention, the rail is constructed as an H-profile, the side flanks of which extend at both ends thereof right-angularly inwardly to form the profile legs which laterally define the guide slots. The center flange of the H-profile divides the cross-sectional area formed by the rail into two separate hollow spaces each of which has the task of receiving the fastening elements for the stops and measuring bolts arranged at opposite sides of the rail. Such fastening elements are advantageously made of rectangular, flat plates provided with a threaded hole into which the threaded bolts for the stops and the measuring bolts may be screwed, and the dimensions of which are so selected that they slide with little clearance in the hollow spaces between the side flanges of the rail profile.

The end-stops preferably have the form of a rectangular base with side flanks as measuring surfaces rising at both sides and at right angle to the base and to the rail providing a generally L-shaped appearance. Such a measuring surface may be defined as a surface which is accurately finished to provide a precise measuring element. The limit stops have essentially the same shape as the end-stops; however, one of the side flanks in the upper part thereof is angularly offset by the amount of the permissible tolerance creating two measuring surfaces for the limit measurements. In order to provide a sure guidance at the rail, both stops (end-stop and limit-measure stop) are provided at the base thereof with a raised guide flange of the same width as the guide slots in the rail and are provided on both sides of the guide flange with a plane surface which serves as a support surface resting on the lateral profile legs of the rail. For the fastening to the rail, screws are provided which are inserted into bore holes in the stops and countersunk, and then are fastened to the rail by means of a threaded plate.

Aside from the stops, one-piece measuring bolts are provided according to the present invention, which bolts consist of an upper cylindrical measuring pin with short centering point, a center wrench engagement portion of larger cross-section than the width of the guide slot in the rail and a lower cylindrical screw bolt which may be inserted into the slots with little clearance for engagement with a corresponding threaded plate. The wrench engaging portion may be constructed as a hexagon or as a cylindrical piece provided with flat machined portions.

Furthermore, the structural measuring gauge according to the invention is additionally provided with one piece centering pins each of which consisting of a centering point having the form of a pointed cone, a hexagon portion for the wrench engagement and a cylindrical screw bolt which can be inserted into the slots with little clearance.

It is an object of the present invention to provide a structure measuring gauge for use in the manufacture of wood, plywood and building panels having an upper and a lower limit measurement for checking required tolerances in the manufactured article.

It is another object of the present invention to provide a structural measuring gauge of the type described having at least two surfaces which are useful without change to said gauge.

It is a further object of the present invention to provide a structural measuring gauge of the type described having stop members, center pins and measuring bolts fastened thereto in such a manner that the fastening means therefore permits use of at least two sides of said gauge.

It is still another object of the present invention to provide a structural measuring gauge of the type described wherein a plurality of stop members, center pins and measuring bolts may be adjustably positioned for use to establish longitudinal measurements on one side of said gauge and lateral measurements on another side of said gauge.

It is still a further object of the present invention to provide a structral measuring gauge of the type described provided with at least two stop members, one of which is provided with a pair of offset surfaces for checking tolerances in manufactured articles, which gauge is structurally uncomplicated and capable of adjustment over a wide range of limits.

Further details, characteristics and advantages of the invention are included in the following description of the corresponding drawings in which one preferred embodiment of the inventive structural measuring gauge and its details is illustrated in a number of views, of which:

FIGURE 2 shows a longitudinal side view of the measuring gauge of FIGURE 1 with different arrangement of the individual parts;

FIGURE 3 shows a longitudinal top view of the measuring gauge of FIGURE 2;

FIGURE 4 shows a cross-section along line IV—IV in FIGURE 2;

FIGURE 5 shows a cross-section along line V—V in FIGURE 2;

FIGURE 6 is a perspective view of the invention with the rail broken off and provided on top and bottom with a mounted limit stop; and FIGURE 7 is a detail of the lower limit-measure stop together with the corresponding threaded plate in an exploded view.

Figure 1:
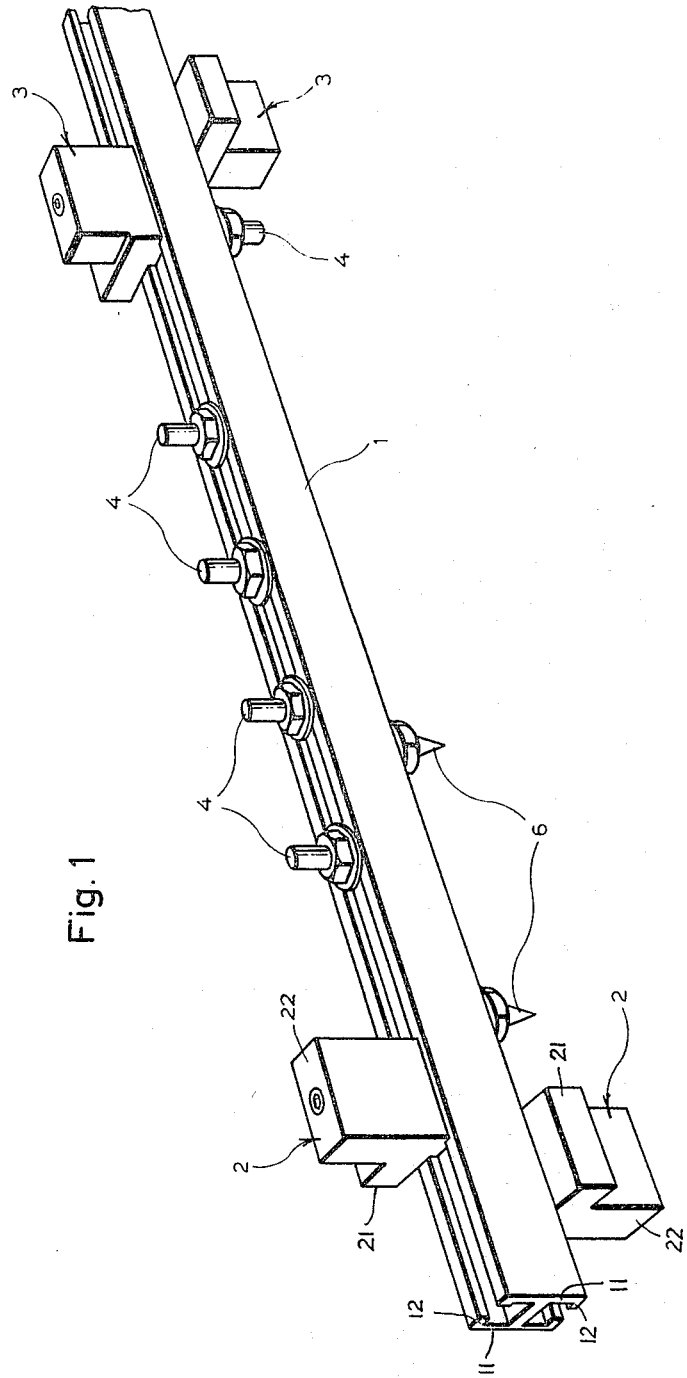
FIGURE 1 shows the structural measuring gauge provided on opposite surfaces with stop members, measuring bolts and centering pins in perspective view.

Referring now to the drawings wherein like reference numerals are used throughout the views to designate like parts, and particularly FIGURE 1, wherein one preferred embodiment of the invention is shown generally consisting essentially of rail 1, provided with end stop-member 2 fastened to opposite sides of the rail, limit-measure stops 3 also screwed into the upper and under side of the rail at the end thereof opposite said end-stop members, one or more measuring bolts of smaller cross-section, one or more measuring bolts 5 (FIGURE 2) of larger cross-section, two center points 6 fastened onto the under side of the rail 1.

Looking at FIGURES 4–6, it is seen that the rail 1 is provided with an H-profile having two lateral legs 11, the upper and lower edges of which are trimmed to form right-angled inwardly extending profile legs 12 provided with flat support surfaces on the outside thereof. Formed between the two profile legs 12 are an upper and a lower guide slot 13 for accommodating the end stop members 2, limit-measure stops 3, measuring bolts 4, 5 and center points 6. By means of the lateral flange 11, the profile legs 12 and the center flange 14, an upper and a lower hollow space 15 and 16 are created in the rail 1 extending over the entire length thereof in which the threaded plates 7 for fastening the attachments are guided. A support ring 17 is attached to one end of the rail which serves as a means for hanging the guide and at the same time serves as an identification of the side on which the limit-measure stop is arranged.

The end-stop members 2 are provided with base portion 21 with side flanks 22 dimensioned such that in the operative position portion 21 extends beyond one longitudinal edge of the rail 1 and side flank 22 rises symmetrically from the edge of the rail. The side flanks 22 of the end stop members 2 which extend perpendicularly to the longitudinal axis of rail 1 serve as measuring surfaces. The base portion 21 of the stop member 2 is provided with a raised guide flange (FIGURE 1) extending longitudinally and of such width that it is guided with little clearance in the guide slots 13 of the rail. The parts of the base portion which remain on both sides of the guide flange are formed as flat support surfaces tightly supported on the lateral profile legs 12 of the rail.

As seen in FIGURE 4, the end-stop members are provided with a smooth bore 27 extending from the top to the bottom thereof into which a screw 28 is inserted with the head thereof accommodated within the enlarged upper part of the bore. By means of the screw 28 in combination with threaded plate 7 the end stop member 2 is secured to the rail 1.

The limit-measure stops 3 are constructed essentially similar to end-stop members 2 with an enlarged base portion 31, and a head portion 32 symmetrically projecting away from the rail. The side flanks 33a and 33b of the stops 3 serve as measuring surfaces. Provided in the base portion 31 is a longitudinally extending raised guide flange 35 for guidance in the slots 13 of the rail, and support surfaces 36 disposed laterally of the guide flange 35. A bore (not shown) for screws 38 is provided as a means of attachment for the stop to the rail 1 in conjunction with a threaded plate 7.

The stops 3 differ from the end-stop members 2 described above only by the construction of one side flank 33a which does not form a smooth surface with flank 33b but is reduced by the amount of the required tolerance, whereby the two measuring offset surfaces 33a, 33b are created. The one measuring surface 33a under the rail forms the lower limit measure and the measuring surface 33b forms the upper limit measure.

The measuring bolts 4 and 5 (FIGURES 1 and 5) formed as one piece consist each of an upper cylindrical measuring pin 41 and 51, respectively, onto which at the upper circular surface thereof a short center point 42 and 52, respectively, is provided, a middle portion for the engagement therewith of a wrench, and a lower cylindrical threaded bolt 43 the diameter and the length of which is selected such that it may be inserted in the slot 13 in the rail 1 with little clearance. In securing the bolt to the rail, the cylindrical bolt 43 cooperates with a threaded plate 7. In the embodiment of the measuring bolt indicated as 4, the measuring pin 41 is provided with only a small diameter; the middle portion for engagement of the wrench is enlarged in relation thereto and is formed as a hexagon 44. Whereas, in the embodiment of the measuring bolt 5 with the larger diameter measuring pin 51, the wrench engaging portion is formed by cylindrical portion 54 provided with parallel notches 54a at opposite sides. For attachment to rail 1 a washer 45 and 55, respectively, is provided in conjunction with hexagon and cylindrical member 54.

The center pins 6, which are usually attached to the underside of the rail by means of threaded plates 7, consist of a pointed conically shaped center point 61, a hexagon 62 for engagement with a wrench and a cylindrical threaded bolt 63 along with a washer 64 for fastening to the rail 1 by means of a threaded plate 7.

For fastening all described members 2 to 6 to the rail 1, threaded plates 7 of square shape are used with centered threaded hole 71, the length of the side of which corresponds to the distance between the side flanges 11 of the rails so that they are movable in a longitudinal direction therebetween.

The mode of operation of the inventive structural measuring gauge in the manufacture of furniture, plywood, building panels and other furniture building panels corresponds to the mode of operation of conventional measuring gauges. All the parts to be fastened to the rail—stops, limit-measure stops, measuring bolts and center pins—may be arranged at any position of the rail and can be fastened thereto with simple tools of conventional form. The measuring bolts which serve for the positioning of bores, recesses and notches and the centering pins may be positioned on the rail in any number and at any distance according to need. Of particular advantage is the two-sided use of the inventive measuring gauge which is made possible by the special construction of the rails in an H-shaped configuration and by the relocation of the screw members used for the fastening of the stops 2, 3, measuring bolts 4, 5 and centering pins 6 in the hollow spaces 15 and 16 of the rail. For example, the measuring gauge may be used on one side for the establishment of the longitudinal measurements and on the other side for the lateral measurements. The limit-size stop 3 provides by the measuring surfaces 33a, 33b, the immediate determination as to whether the tolerance of a workpiece is kept.

I claim:
1. A structural measuring gauge for use as a measuring gauge in the manufacture of wood, plywood and sliding panels, particularly in the manufacture of furniture, comprising:
   rail means formed as a symmetrical member having slot means formed therein,
   said symmetrical member comprising mutually parallel side members connected by a transverse member extending perpendicularly thereto,
   said symmetrical member when viewed in cross-section through said side members and said transverse member having the form of the letter H, said side members and said transverse member defining rectangular space means within said symmetrical member,
   measuring means adjustably fastened to said symmetrical member over said slot means,
   said side members comprising terminal portions extending parallel to said transverse member and forming support surfaces on either of said slot means,
   and fastening means for securing said measuring means to said symmetrical member,
   said measuring means including a substantially L-shaped end-stop member having a single planar measuring reference surface and a substantially L-shaped limit-measure stop having a pair of parallel measuring reference surfaces offset from each other by the amount of an allowable tolerance in the manufactured article, said measuring surfaces of said end-stop member and said limit measure stop being arranged on said rail means in confronting relationship.

2. A structural measuring gauge according to claim 1 wherein said end-stop member and said limit-measure stop are provided with guide flange means positioned within said slot means for guiding said end-stop member and said limit-measure stop during sliding adjustment thereof along said slot means.

3. A structural measuring gauge according to claim 1 wherein said end-stop member and said limit-measure stop each have a lateral leg portion extending beyond one longitudinal edge of said rail means, each said lateral leg portion providing at least a portion of said measuring reference surfaces.

4. A structural measuring gauge according to claim 1 wherein said fastening means includes plate means mounted within said rectangular space means on one of said slot means and screw means extending through said end stop member and said limit-measure stop into threaded engagement with respective plate means.

References Cited
UNITED STATES PATENTS

| Re. 25,240 | 9/1962 | Price | 33—174 |
| 105,352 | 7/1870 | McKean | 33—143 |
| 760,353 | 5/1904 | Stone | 33—158 |
| 844,536 | 2/1907 | Prindle | 33—143 |
| 1,653,016 | 12/1927 | Mellon | 33—158 X |
| 2,367,582 | 1/1945 | Honyoust | 33—189 X |
| 2,525,186 | 10/1950 | Sosdian | 33—159 |
| 2,577,509 | 12/1951 | Bryant | 33—174 |

LEONARD FORMAN, *Primary Examiner.*

W. D. MARTIN, *Assistant Examiner.*